US008288947B2

(12) United States Patent
Yokota et al.

(10) Patent No.: US 8,288,947 B2
(45) Date of Patent: Oct. 16, 2012

(54) LIGHT SOURCE DEVICE

(75) Inventors: Toshio Yokota, Gotenba (JP); Taku Sumitomo, Himeji (JP); Yukio Yasuda, Himeji (JP)

(73) Assignees: Ushio Denki Kabushiki Kaisha, Tokyo (JP); Energetiq Technology, Inc., Woburn, MA (US)

( * ) Notice: Subject to any disclaimer, the term of this patent is extended or adjusted under 35 U.S.C. 154(b) by 3 days.

(21) Appl. No.: 12/903,713

(22) Filed: Oct. 13, 2010

(65) Prior Publication Data

US 2011/0085337 A1 Apr. 14, 2011

(30) Foreign Application Priority Data

Oct. 13, 2009 (JP) ................................ 2009-236040

(51) Int. Cl.
*H01J 61/00* (2006.01)
*G01J 1/00* (2006.01)
*G02B 27/20* (2006.01)

(52) U.S. Cl. ...................... 313/567; 250/503.1; 362/259

(58) Field of Classification Search ............... 250/503.1; 313/567; 362/259

See application file for complete search history.

(56) References Cited

U.S. PATENT DOCUMENTS

2002/0021508 A1 2/2002 Ishihara
2007/0228288 A1 10/2007 Smith
2007/0228300 A1 10/2007 Smith
2007/0274075 A1* 11/2007 Nagamune .................... 362/259
2009/0032740 A1 2/2009 Smith et al.
2009/0272919 A1* 11/2009 Abe et al. .................. 250/504 R

FOREIGN PATENT DOCUMENTS

JP 61-193358 A 8/1986

* cited by examiner

*Primary Examiner* — Karabi Guharay
*Assistant Examiner* — Michael Santonocito
(74) *Attorney, Agent, or Firm* — Roberts Mlotkowski Safran & Cole, P.C.; David S. Safran

(57) ABSTRACT

In a light source device provided with a light emission tube in which a light emitting element is enclosed and at least one laser oscillator part for radiating a laser beam towards said light emission tube, for focusing a beam within a light emission tube with a large solid angle and for preventing that the beam with a high energy density impinges upon the wall of the light emission tube, the light emission tube has a tube wall, part of which is made to function as a focusing means, or the light emission tube has a focusing means at the inner surface thereof.

10 Claims, 8 Drawing Sheets

Fig. 4 (a)
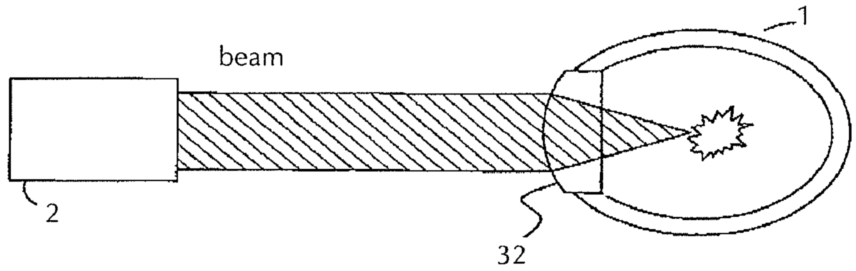
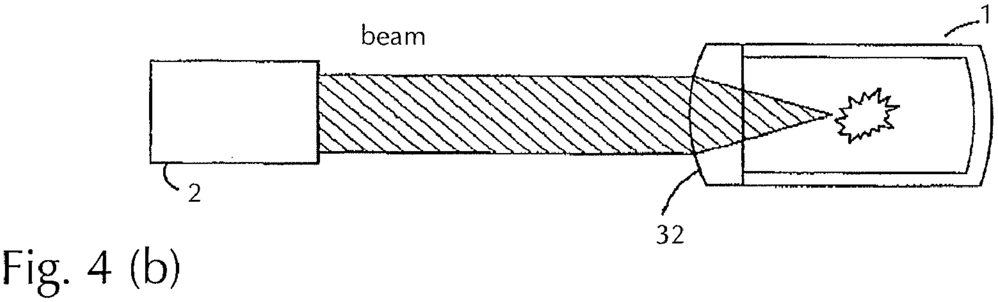
Fig. 4 (b)
Fig. 5 (a)
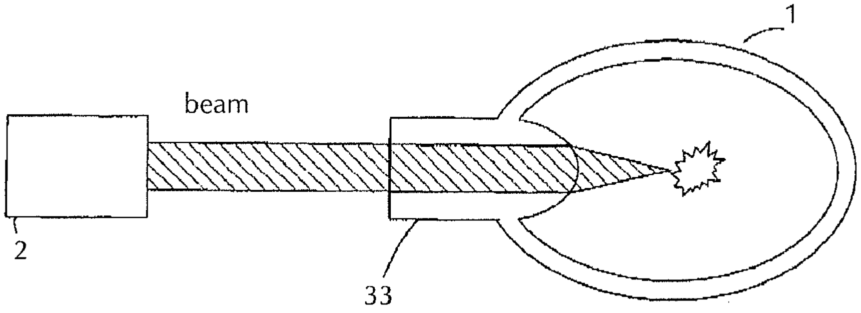
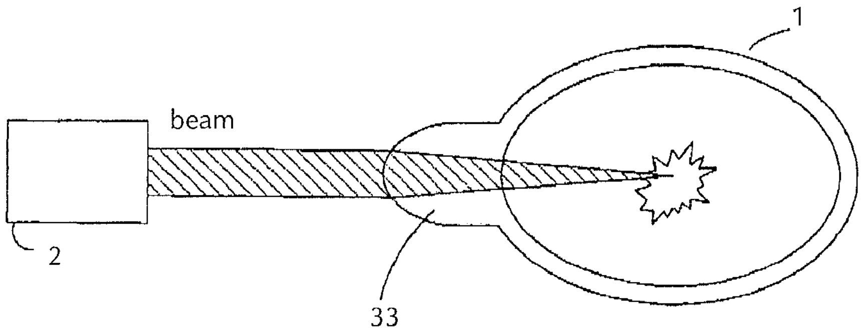
Fig. 5 (b)

Fig. 9 (a)
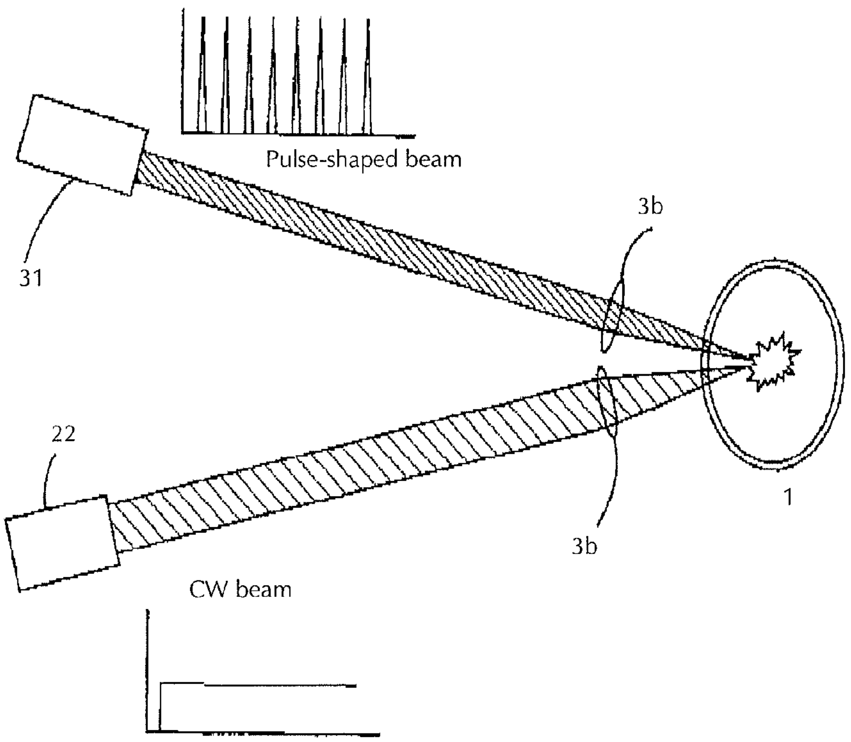
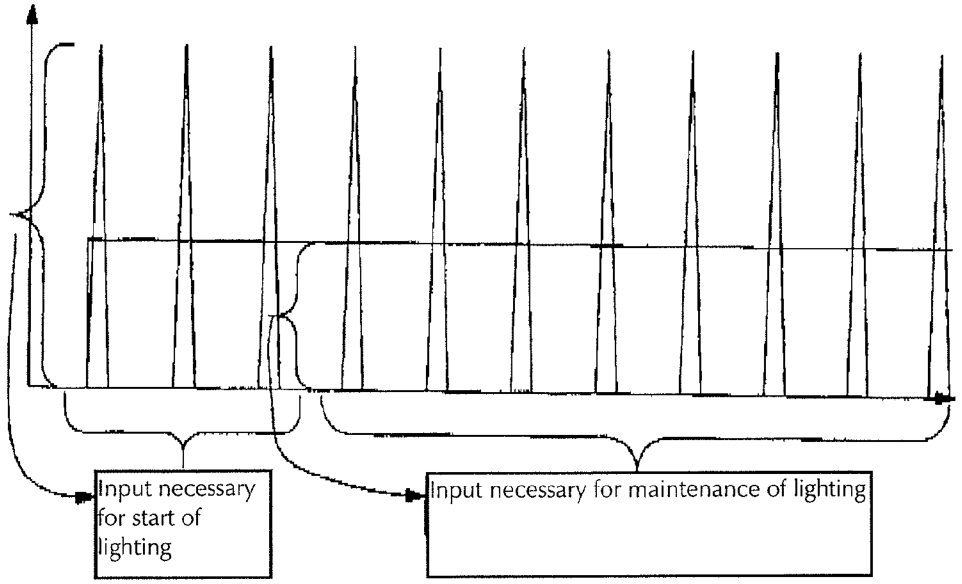
Fig. 9 (b)

LIGHT SOURCE DEVICE

BACKGROUND OF THE INVENTION

1. Field of Invention

The present invention relates to a light source device lighted by means of a laser beam emitted from a laser device, which is ideally suited for use in an exposure device.

2. Description of Related Art

Light source devices which are configured such that a laser beam from a laser device is radiated towards a light emission tube in which a light emitting gas is enclosed, the gas is excited and light is emitted are known (see JP-A-61-193358 (1986)). With the device disclosed in JP-A-61-193358 (1986), a beam from a laser oscillator oscillating continuous or pulse-shaped laser light is focused by a focusing component of an optical system such as a lens and radiated towards a light emission tube in which a light emitting gas (light emitting element) is enclosed. The light emitting gas in the light emission tube is excited and light is emitted.

As is shown in the JP-A-61-193358 (1986), the light emission tube can be lighted by radiating a laser beam towards a light emission tube in which a light emitting element is enclosed and generating a high-temperature plasma state in the interior of the light emission tube. The high-temperature plasma state arising in the interior of the light emission tube is generated by an energy density of the beam amounting to at least the threshold value for an ionization of the light emitting element, and a high density of the ionized light emitting element. To this end it is necessary to increase the energy density of the beam and to bring it to at least the threshold value for an ionization of the light emitting element by means of focusing the beam by a focusing component of an optical system. Thus it is contemplated to use a focusing component of an optical system (focusing means) 3 to focus the laser beam in the interior of the light emission tube 1 and to render the energy density of the beam large, as is shown in FIG. 13. If, at this time, the solid angle of the beam is small, the region in which the energy density amounts to at least the threshold value expands in the direction of the optical path of the beam, the ionized region becomes long and thin and the radiance decreases. The fact that the radiance is low means that the energy density is low, and the light emitting element loses the high density and it is difficult to generate a high-temperature plasma state.

To increase the solid angle of the beam, it is contemplated to render the focusing component of the optical system larger than the outer diameter of the light emission tube and to arrange it close to the light emission tube, as is shown in FIG. 13, but when the focusing component of the optical system is rendered large and the focusing is performed such that the solid angle becomes large, there is the problem that a beam with a high energy density impinges upon the wall of the light emission tube being present on the focused light path, the wall is heated, and damages such as a devitrification or a bursting occur. Then, as it is quite frequent that optical components such as collecting mirrors etc. are arranged in the vicinity of the light emission tube, it is often difficult to arrange an optical focusing element with a large diameter close to the light emission tube.

SUMMARY OF THE INVENTION

The present invention was made with regard to the above circumstances, and the object of the present invention is to provide a light source device in which the lighting is performed by radiating a laser beam towards a light emission tube in which a light emitting element is enclosed and lighting the light emission tube, wherein the beam is focused with a large solid angle and the light emission tube can be lighted efficiently without arranging a focusing means with a large diameter in the periphery of the light emission tube, and devitrification or breaking of the light emission tube because of a beam with a high energy density impinging upon the wall of the light emission tube can be prevented.

To render the solid angle of the focusing laser beam large, it is desirable to arrange a focusing means as close as possible to the focusing point. If the focused beam with a high energy density does not impinge upon the tube wall of the light emission tube, devitrification or breaking etc. of the light emission tube can be prevented. In the present invention, a part of the tube wall of the light emission tube is made to function as a focusing means or a focusing means is provided in the interior of the light emission tube remote from the inner surface of the light emission tube. By doing so the focusing means can be arranged closer to the focusing point as compared with a provision of the focusing means exterior of the light emission tube, and the solid angle at the focusing point can be rendered large. Then, the focused beam with a large energy density does not impinge upon the tube wall of the light emission tube and devitrification or breaking etc. of the light emission tube can be prevented.

Based on the above statements, the above mentioned problems are solved by the present invention as follows:

(1) In a light source device being provided with a light emission tube in which a light emitting element is enclosed and a laser oscillator part radiating a laser beam towards said light emission tube, wherein the light emission tube is lighted by means of generating a high-temperature plasma state in the interior of the light emission tube by the laser beam, a part of the tube wall of said light emission tube is made to function as a focusing means or a focusing means is provided in the interior of the light emission tube remote from the inner surface.

(2) To make a part of the tube wall of said light emission tube to function as a focusing means, in the above point (1) a meniscus structure is implemented in which the radius of curvature of the outer surface of said light emission tube is rendered small while the radius of curvature of the inner surface thereof is rendered large.

(3) To make a part of the tube wall of said light emission tube to function as a focusing means, in the above point (1) a plano-convex structure is implemented in which the outer surface of said light emission tube is rendered a curved surface while the inner surface thereof is rendered a flat surface.

(4) In the above point (1), the focusing means provided at the inner surface of said light emission tube is provided remote from the inner surface of the light emission tube.

(5) In the above points (1), (2), (3) and (4) a plurality of focusing means is provided.

With the present invention, the following results can be obtained.

(1) Because a part of the tube wall of said light emission tube is made to function as a focusing means or a focusing means is provided in the interior of the light emission tube remote from the inner surface, the beam can be focused with a large solid angle, the region in which the energy density amounts to at least the threshold value can be rendered small and the high-temperature plasma state can be formed efficiently without arranging a focusing means with a large diameter at the periphery of the light emission tube. Therefore, the light emission tube can be lighted efficiently.

By providing the focusing means in the interior of the light emission tube remote from the inner surface, in particular the distance between the focusing point and the focusing means can be rendered smaller than the radius of the light emission tube and the solid angle at the focusing point can be rendered even larger. As no beam with a high energy density focused by the focusing means impinges upon the wall of the light emission tube, devitrification of the light emission tube and a breakage because of a heating of the light emission tube can be prevented.

(2) By means of implementing a meniscus structure in which the radius of curvature of the outer surface of the light emission tube is rendered small while the radius of curvature of the inner surface thereof is rendered large or by implementing a plano-convex structure in which the outer surface of said light emission tube is rendered a curved surface while the inner surface thereof is rendered a flat surface, a part of the tube wall of the light emission tube can be made to function as a focusing means. Therefore, it can be avoided that the focused light is radiated to the tube wall of the light emission tube and a heating of the tube and a breakage can be prevented.

(3) By means of providing a plurality of focusing means, a plurality of beams can be radiated into the light emission tube and can be focused. Therefore, a plurality of laser beams can be radiated, such as, for example, a pulse-shaped laser beam can be radiated into the light emission tube and a high-temperature plasma state can be formed while a continuous-wave laser beam can be radiated into the light emission tube and the high-temperature plasma state can be maintained, and the light emission tube can be lighted efficiently, such as, for example, the lighting can be maintained stably. Because the beam radiating into the light emission tube can be focused by one focusing means while a laser beam which passes through the light emission tube and leaves from there can be focused by the other focusing means, the processing of transmission light such as, for example, a processing of the transmission light of the light emission tube by means of a beam damper, becomes easy.

BRIEF DESCRIPTION OF THE DRAWINGS

FIG. 4 is a schematic view showing a second embodiment of the light source device according to the present invention.

FIG. 5 is a schematic view showing a case in which a rod lens is used as the focusing means in the second embodiment.

FIG. 9 is a schematic view showing a configurational example for a case in which a pulse-shaped beam and a continuous-wave beam are radiated into a light emission tube via focusing means and the light emission tube is lighted.

DETAILED DESCRIPTION OF THE INVENTION

Figure 1:
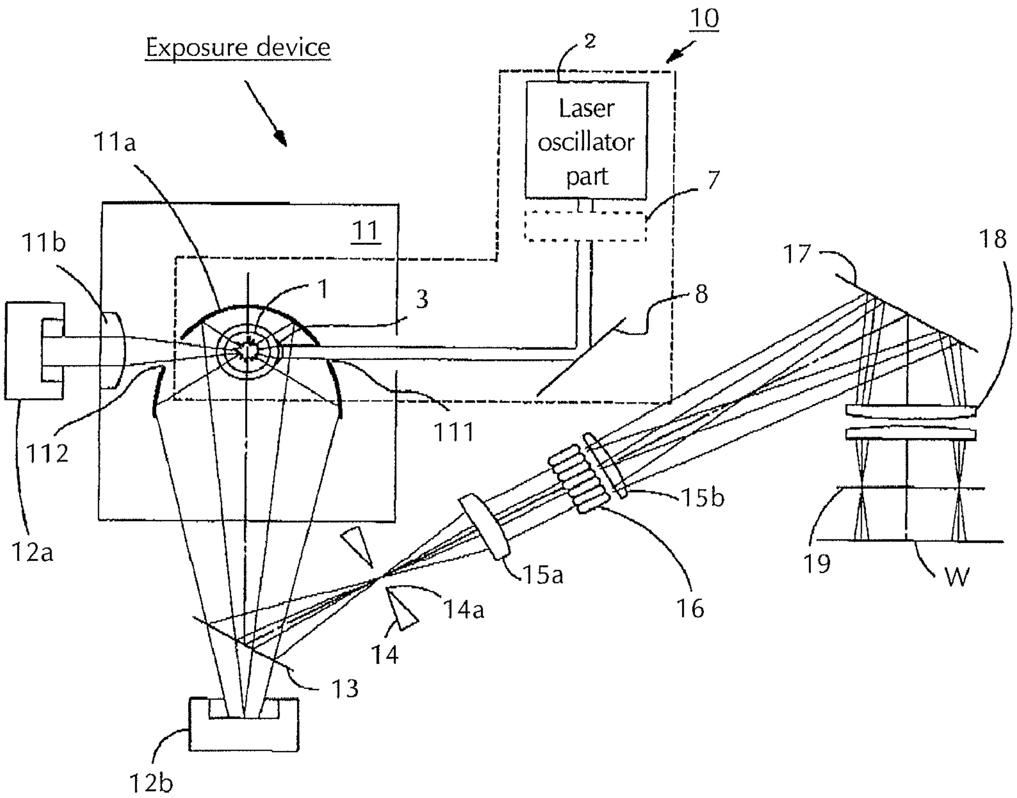
FIG. 1 is a schematic view showing a configurational example for the application of the light source device according to the present invention in an exposure device.
Figure 2:
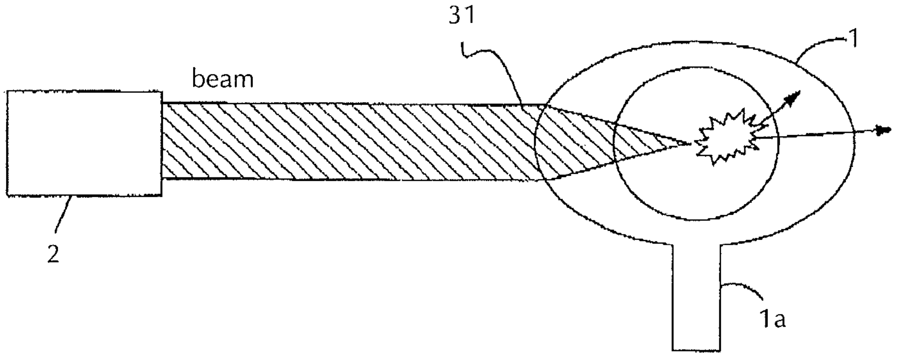
FIG. 2 is a schematic view showing a first embodiment of the light source device according to the present invention.

FIG. 1 is a view showing a configurational example for the application of the light source device according to the present invention in an exposure device being one example for the applicability thereof, and FIG. 2 is a view showing a first embodiment of the light source device according to the present invention.

First, an exposure device provided with a light source device of the present invention will be explained by means of FIG. 1. The exposure device is provided with a light source device 10 emitting light. As this light source device 10 is discussed in detail using FIG. 2, it is only briefly explained here. The light source device 10 is provided with a laser oscillator part 2 and a light emission tube 1 into which the beam from the laser oscillator part 2 radiates. On the light path of the beam from the laser oscillator part 2 to the light emission tube 1, a mechanical shutter 7 and a mirror 8 are provided, and the emission/non-emission of the beam is controlled by the opening and closing of the shutter 7.

The light emission tube 1 is surrounded roughly by a mirror 11 a having an ellipsoid of revolution-shaped reflection surface. The mirror 11*a* has a throughhole 111 into which the light from the laser oscillator part 2 radiates and another throughhole 112 emitting light having passed through the light emission tube 1. The mirror 11*a* and the light emission tube 1 are accommodated in a lamp housing 11. In the present embodiment, a part of the tube wall of the light emission tube 1 is configured such that it functions as a focusing means, and the beam radiating from the one throughhole 111 of the mirror 11*a* into the light emission tube 1 is focused by this focusing means 3 such that a region with a high energy density is formed approximately in the vicinity of the center of the light emission tube 1. At the lamp housing 11 a focusing means 11*b* focusing light which has been emitted from the other throughhole 112 of the collecting mirror 11*a* is provided, and at the outside of the lamp housing 11 a beam damper 12*a* is arranged, into which the light from the focusing means 11*b* radiates and which damps the incident light and makes sure that it does not return into the lamp housing.

The light emitting gas in the interior of the light emission tube is excited by radiating the beam from the laser oscillator part 2 into the light emission tube 1, and excitation light is generated. This excitation light is focused by the mirror 11*a*, is emitted towards the bottom side of the paper sheet in FIG. 1, and reaches a dichroic mirror 13. The dichroic mirror 13 reflects light with the wavelength necessary for the exposure and lets the remaining light pass. At the back side of the dichroic mirror 13 a beam damper 12*b* is arranged, and the light having passed through the dichroic mirror 13 is gathered there and terminates. The light having been reflected by the dichroic mirror 13 is focused by the collecting mirror 1 la and passes through the aperture part 14*a* of a filter 14 arranged at the focal position. This time, the light is shaped according to the shape of the aperture part 14*a*. The light having passed through the aperture part 14*a* is focused, while expanding, by a focusing means 15*a* which is arranged on its way of progression, and becomes approximately parallel light.

This light enters into an integrator lens 16 and is focused by a focusing means **15*b* which is arranged at the emission side. By being focused by the focusing means 15*b*, the light radiating from each cell lens of the integrator lens 16 is piled up within a small distance with the intention to provide uniformness of the irradiance. While being piled up, the light having been emitted from the focusing means 15*b* is reflected by a mirror 17 and enters into a collimator lens 18. The light being emitted from the collimator lens 18 has been made parallel light, passes through a mask 19** and irradiates an object W to be irradiated such as a silicon wafer. Thus, the light from the light source device performs an irradiation treatment of the object W to be irradiated.

Next, the light source device according to a first embodiment of the present invention will be explained using FIG. 2. The light source device of FIG. 2 comprises a light emission tube 1 supported by a supporting body **1*a* and a laser oscillator part 2 emitting a beam towards said light emission tube 1. The light emission tube 1 is made up from a material being transmissive for the beam from the laser oscillator part 2 and being transmissive for the excitation light of the light emitting gas (for example quartz glass). The light emission tube 1 has an elliptical external shape while the shape of the inner surface thereof is, for example, spherical. By means of this, the wall of the light emission tube 1 has a convex-shaped meniscus structure with a small radius of curvature of the outer surface of the light emission tube 1 and a large radius of curvature of the inner surface thereof, and this structure functions as a focusing means 31. The beam from the laser oscillator part 2 is emitted towards this convex-shaped meniscus structure (focusing means 31**) and this beam is focused by the convex-shaped meniscus structure.

Figure 3:
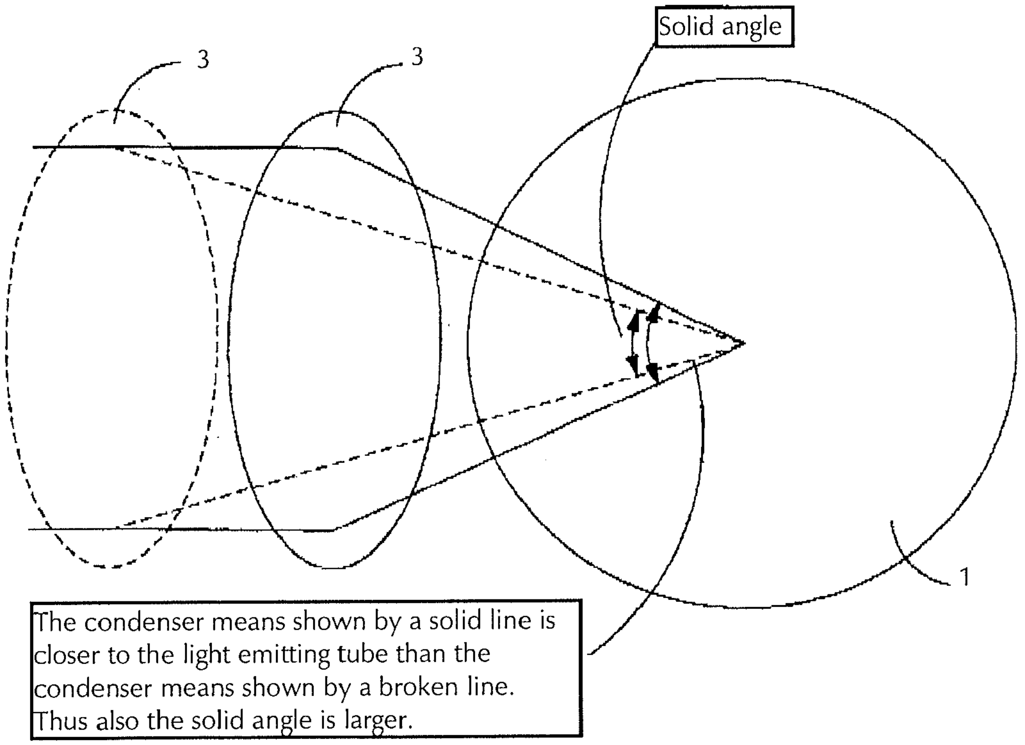
FIG. 3 is a schematic view explaining the relation between the position of the focusing means and the solid angle.

When, as shown in FIG. 3, a focusing means 3 with approximately the same outer diameter as that of the light emission tube 1 is present outside of the wall of the light emission tube 1, the solid angle in the interior of the light emission tube becomes larger with the approach of the focusing means 3 towards the wall of the light emission tube 1. In the present embodiment, the solid angle in the interior of the light emission tube 1 can be rendered even larger as in case of the presence of the focusing means 3 outside of the light emission tube 1 by implementing the wall itself of the light emission tube 1 as a focusing means. If a focusing means with a larger outer diameter than that of the light emission tube 1 were provided outside of the light emission tube 1, it would be possible to render the solid angle larger than in the case of implementing the wall itself of the light emission tube 1 as a focusing means. But, as mentioned above, often optical components such as a collecting mirror are arranged close to the light emission tube and there would be many cases in which an arrangement of a focusing means with a large diameter close to the light emission tube is difficult. In the present embodiment, the wall itself of the light emission tube is implemented as a convex-shaped meniscus structure, and this convex-shaped meniscus structure functions as the focusing means 31. Thus, the solid angle in the interior of the light emission tube can be rendered large.

In FIG. 2, the laser beam emitted from the laser oscillator part 2 is focused in the vicinity of the center part of the interior of the light emission tube 1 such that the solid angle becomes large, and by means of this the energy density thereof increases. In the region in which the energy density of the beam has reached at least the threshold value, the light emitting element enclosed in the interior of the light emission tube 1 is ionized. By means of this a high-temperature plasma state is generated in the interior of the light emission tube and the light emission tube is made to emit light. In the present embodiment, the focusing is performed with a relatively large solid angle as compared to the solid angle of a focusing means being present outside of the light emission tube 1, and the beam region having an energy density with at least the threshold value at which an ionization of the light emitting element is possible can be rendered small. Therefore, the ionized light emitting element can be rendered highly dense, a high-temperature plasma state is formed and the lighting is started.

Now, with the present invention it is desirable for the following reason that the focusing position in the interior of the light emission tube is located in the vicinity of the center part of the light emission tube. When the plasma emits light in the interior of the light emission tube 1 (quartz tube), the temperature of the plasma emitting light reaches several thousand degrees and the quartz is heated by the plasma according to the distance to the tube wall of the light emission tube 1. When the temperature of the heated quartz becomes high, the quartz melts and devitrification etc. occurs and a destruction because of pressurized gas is induced. If the distance from the plasma to the quartz is rendered uniformly, the interior of the light emission tube is heated evenly, but if the plasma is positioned eccentrically in the interior of the light emission tube, regions with a short distance from the plasma become possible, which is supposed to generate devitrification and to induce a destruction. The distance for a non-occurrence of devitrification can be determined by experiments, but as the inner surface of the light emission tube is heated evenly when the plasma is located in the vicinity of the center of the light emission tube, destructions of the tube by devitrification etc. can be avoided if the inner diameter of the tube is implemented with a size at which no devitrification occurs.

The light emission tube with the meniscus structure of the present embodiment can be manufactured, for example, as follows:

(1) Method 1 for Manufacturing the Meniscus Structure

First, the center of a pipe-shaped quartz glass tube is pressed from both sides while being heated and the quartz is gathered in the center, and then the interior of the pipe is heated and made to bulge out while being pressurized. As, at this time, a uniform bulging in the interior of the pipe is attempted, a spherical inner wall is formed. While the 'heating', 'gathering in the center' and 'pressurizing' are performed repeatedly several times, an object with a spherical center is produced. By means of pressing a press-forming mold to the spherically bulged outer surface, an outer surface shape with a smaller radius of curvature than that of the spherical inner surface is formed. Finally, both ends are closed by heating and melting and a quartz glass tube with a spherical space, that is, a light emission tube provided with a meniscus structure is formed.

(2) Method 2 for Manufacturing the Meniscus Structure The inner part and the outer part of a rod-shaped quartz are cut half-spherically and a meniscus structure wherein the radius of curvature of the outer surface is smaller than that of the inner surface is provided. Two such objects are prepared and unified by bonding, heating and melting the spherical parts.

Because, as mentioned above, in the present embodiment the wall itself of the light emission tube 1 functions as a focusing means and the beam is focused in the interior of the light emission tube 1, the focused beam does not irradiate the wall of the light emission tube 1 and a heating and damaging thereof can be prevented. Further, by means of focusing the beam in the interior of the light emission tube 1 and by rendering the solid angle of the beam large, the beam is able to reach at least the threshold value at which the light emitting element can be ionized in the interior of the light emission tube, and the region having at least this threshold value can be implemented small. Thus, a high-temperature plasma state can be formed in the interior of the light emission tube and the starting of the lighting can be performed well. Because, as was mentioned above, the light source device of the present embodiment can prevent damages of the light emission tube and the starting of the lighting can be performed well, objects to be irradiated can be irradiated in a device being provided with this light source device (for example the exposure device shown in FIG. 1) continuously and, because of the ability to perform the starting of the lighting well, also fast.

Then, the light emission tube of the present embodiment is a convex-shaped meniscus structure and a focusing means is fanned at both the left and the right side of the paper sheet. Therefore, a focusing means formed in the light emission tube 1 can be used instead of the focusing means 11*b* in FIG. 1 and the light leaving the light emission tube 1 can be focused towards the beam damper 12*a* (this will be discussed later).

The light source device according to the present embodiment can be used as the light source of the exposure device shown in FIG. 1, but if the light emitting element in the light emission tube is changed, the emission light from the light emission tube can be changed to light with various wavelengths and the light source device can also be used as the light source for a projector being a light source for visible light. That is, hitherto known light sources, so-called lamps, wherein a pair of electrodes is arranged opposite to each other in the interior of the light emission tube are used for various purposes, but the light source device according to the present invention can be used as a substitute for these lamps and can be used for the same purposes as these lamps. The shape of the inner surface of the light emission tube was implemented spherical but as it is sufficient if a convex-shaped meniscus structure can be formed at the outer surface of the light emission tube, the shape of the inner surface can also be elliptical.

In the following, examples for numerical values and materials for the first embodiment are shown.

Material of the light emission tube: quartz glass;
Outer diameter of the light emission tube: 20 mm;
Inner diameter of the light emission tube: 16 mm;
Light emitting element enclosed in the interior of the light emission tube: Xe, mercury;
Enclosed pressure or enclosed amount of xenon gas: 10 atm, 1 mg;
Laser crystal of the laser oscillator part: YAG crystal;
Wavelength of the beam: 1064 nm.

A second embodiment will be explained using FIG. 4. The light source device of FIG. 4 is provided with a light emission tube 1 and a laser oscillator part 2 emitting a beam towards said light emission tube 1. The light emission tube 1 of the present embodiment uses a plano-convex lens instead of a wall with a convex-shaped meniscus structure. The light emission tube 1 is made up from a material being transmissive for the beam from the laser oscillator part 2 and being transmissive for the excitation light of the light emitting gas (for example quartz glass).

FIG. 4(*a*) shows a case in which a plano-convex lens 32 functioning as a focusing means is attached by heating and welding to a spherical element from which a part has been cut out. FIG. 4(*b*) shows a case in which a cylindrical light emission tube is formed, the end portion thereof is cut off, and a plano-convex lens functioning as a focusing means is attached to this cut-off portion by heating and welding.

In FIG. 4(*a*) as well as (*b*) the attached plano-convex lens is arranged such that the flat surface part thereof becomes the inner surface of the light emission tube 1 while the convex surface becomes the outer surface thereof The beam from the laser oscillator part 2 is radiated into the plano-convex lens 32 shown in FIGS. 4(*a*) and (*b*), and this beam is focused in the interior of the light emission tube 1 such that the solid angle becomes large. By means of this, the energy density of the beam increases. The light emitting element enclosed in the interior of the light emission tube 1 is ionized in the region in which the energy density of the beam has reached at least the threshold value, a high-temperature plasma state is generated and the lighting starts. Because also in the present embodiment the wall itself of the light emission tube 1 functions as a focusing means and the beam is focused in the interior of the light emission tube 1, as mentioned above the focused beam does not irradiate the wall of the light emission tube 1, and a heating and damaging thereof can be prevented. Then, because the beam is focused in the interior of the light emission tube 1 and the solid angle of the beam is rendered large, a high-temperature plasma state can be formed in the interior of the light emission tube and the starting of the lighting can be performed well.

In the above-mentioned embodiment, the focusing means formed in the wall of the light emission tube is not limited to a plano-convex lens and for example also a rod lens 33 can be used, as is shown in FIGS. 5(*a*) and (*b*). When the beam is radiated into the focusing means, a portion (for example several % of the beam energy) may be reflected by the focusing means. When, as shown in FIG. 5(*a*), the flat face of the rod lens 33 is positioned at the outward side of the light emission tube 1, the flat face of the rod lens 33 can be arranged at a position to which the heat emitted from the high-temperature plasma state in the interior of the light emission tube 1 is hardly transferred. Thus it can be prevented in case of the provision of an AR-coat (a so-called anti-reflection coat) at the rod lens 33 that the AR-coat is vaporized by the heat of the high-temperature plasma state, and a reflection of the beam radiated into the flat face can be suppressed by this AR-coat.

A third embodiment will be explained using FIG. 6. A light emission tube 1 supported by a supporting body and a laser oscillator part 2 emitting a beam towards said light emission tube 1 are provided. Both the outer surface and the inner surface of the light emission tube 1 of the present embodiment are roughly spherical. At the inner surface a focusing means 34 fixed by a rod-shaped fixing part 6 is provided. This focusing means 34 can be used as a focusing means having the function to focus towards the center of the light emission tube 1, and for example, as shown in this drawing, a convex lens can be used.

Figure 6:
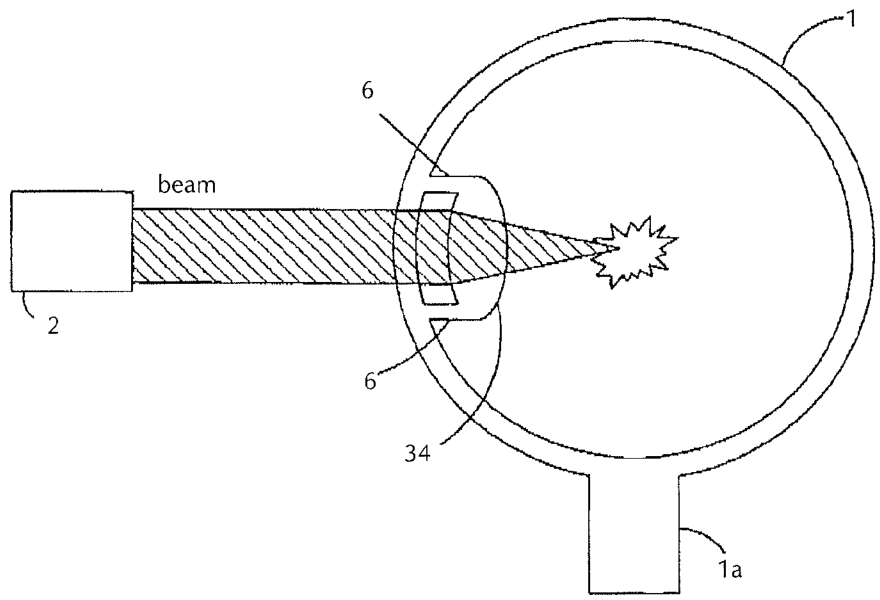
FIG. 6 is a schematic view showing a third embodiment of the light source device according to the present invention.

In FIG. 6, the beam from the laser oscillator part 2 radiates into the outer surface of the wall of the light emission tube 1 at which the focusing means 34 is provided, and the beam having passed through the wall of the light emission tube 1 radiates into the focusing means 34. This beam is focused by the focusing means 34 such that the solid angle becomes large and the energy density increases. In the region in which the energy density of the beam has reached at least the threshold value, the light emitting element enclosed in the interior of the light emission tube 1 is ionized, a high-temperature plasma state is formed and the lighting is started. Because in the present embodiment the focusing means is provided in the interior of the light emission tube 1 and the beam is focused in the interior, the focused beam does not irradiate the wall of the light emission tube 1 and a heating and damaging thereof can be prevented.

Then, because the beam is focused in the interior of the light emission tube 1 and the solid angle of this beam can be rendered large, a high-temperature plasma state can be formed in the interior of the light emission tube and the starting of the lighting can be performed well. As, in particular, the focusing means 34 is provided in the interior of the light emission tube 1, the solid angle can be rendered larger than in the case of the wall of the light emission tube 1 functioning as the focusing means such as in the above-mentioned embodiments 1 and 2. The light emission tube having the focusing means at the inner surface can be manufactured, for example, by preparing two elements for which the inner part and the outer part of a respective rod-shaped quartz glass has been cut to a half-spherical form, melting and welding a focusing lens to one of these inner parts, joining these two half-spherical forms such that a spherical form is obtained, and heating and melting.

In the embodiment explained above, a provision of one focusing means has been explained but the beam can be focused with an even larger solid angle by providing a plurality of focusing means. Concretely, in addition to the focusing means provided at the light emission tube a focusing lens is provided at the outside or in the interior of the light emission tube.

Figure 7:
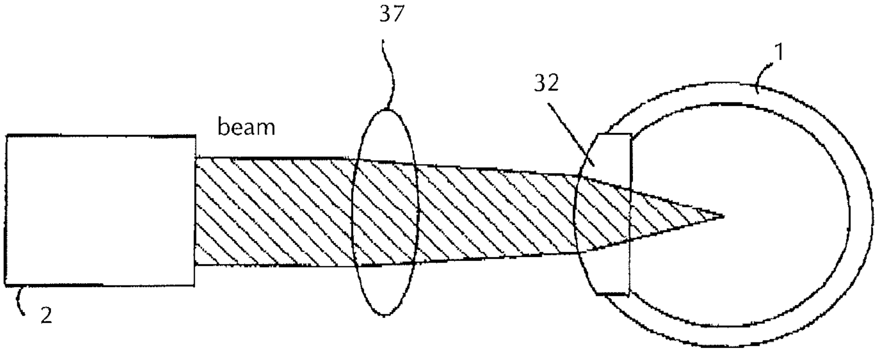
FIG. 7 is a schematic view showing a fourth embodiment of the light source device according to the present invention.
Figure 7:
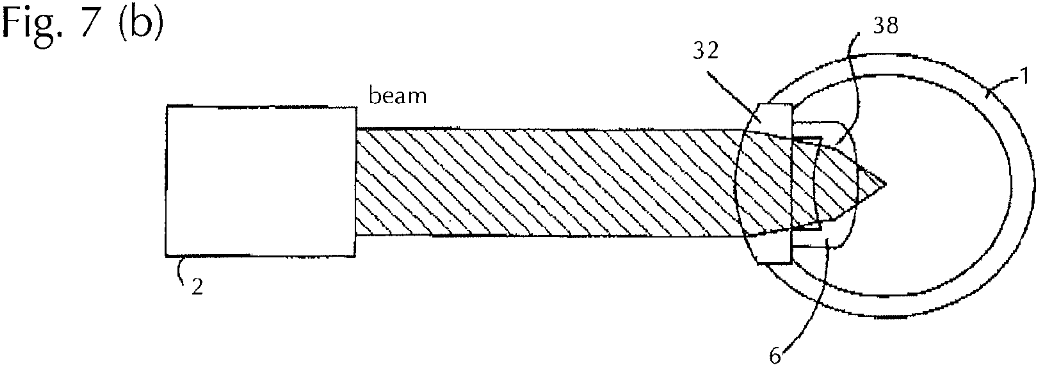
Figure 7:
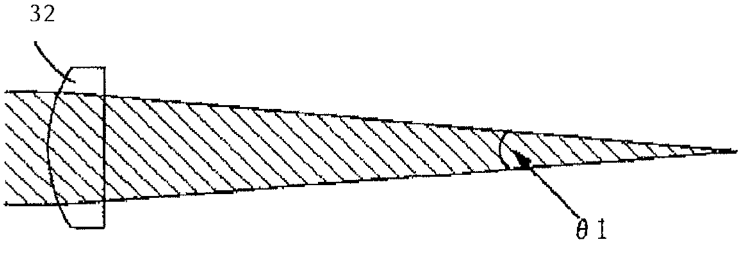
Figure 7:
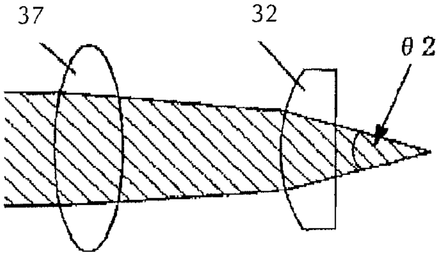

FIG. 7 is a view showing a fourth embodiment of the present invention in which a plurality of focusing means is provided such as mentioned above. FIG. 7(*a*) shows a configurational example of a case in which a focusing lens 37 is provided outside of the light emission tube in addition to the provision of the focusing means 32 at the light emission tube 1 as shown in FIG. 4(*a*). FIG. 7(*b*) shows a configurational example of a case in which a focusing lens 38 is provided in the interior of the light emission tube as shown in FIG. 6 in addition to the provision of the focusing means 32 at the light emission tube 1 as shown in FIG. 4(*a*).

In the case of FIG. 7(*a*), a focusing lens 37 provided outside of the light emission tube 1 and focusing towards the focusing means 32 provided at the light emission tube 1 is provided, and this focusing lens 37 has such a focal length that the focusing position reaches a position at the right side of the paper sheet from the focusing means 32 (at the inner side of the light emission tube 1 from the focusing means 32). Thus, the beam from the laser oscillator part 2 is focused by the focusing lens 37 and is radiated into the focusing means 32, but the beam is radiated into the focusing means 32 before being focused, and is further focused by the focusing means 32 and is focused in the interior of the light emission tube 1.

As shown in FIG. 7(*c*), in case of a focusing only by the focusing means 32 the solid angle becomes θ1, but by means of a focusing by the focusing lens 37 before the radiation into the focusing means 32, as shown in FIG. 7(*d*) a focusing with a solid angle θ2 being larger than θ1 becomes possible even if the focusing means 32 has the same focal length as the focusing lens 37 shown in FIG. 7(*a*). Thus, by arranging the focusing lens 37 outside of the focusing means 32 as shown in FIG. 7(*a*), the solid angle can be rendered larger as compared to the case of only the focusing means 32.

Figure 13:
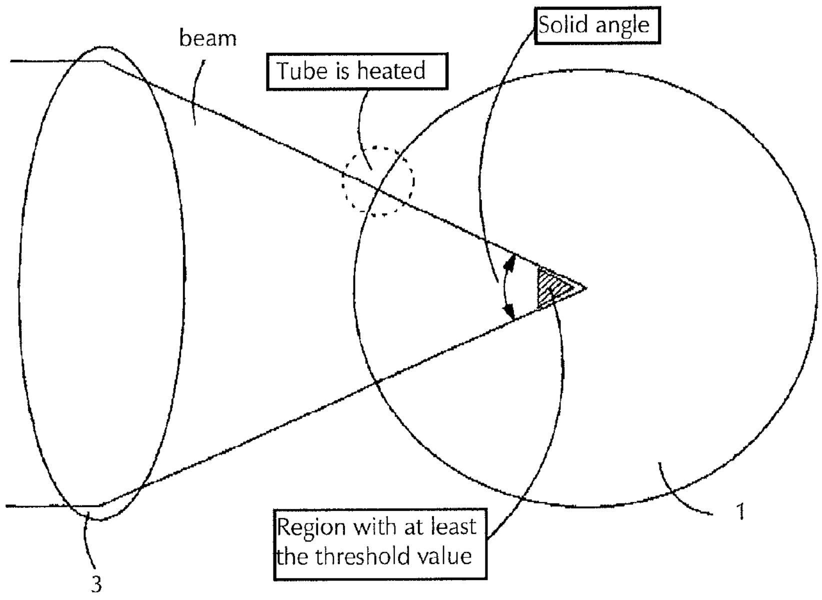
FIG. 13 is a schematic view explaining the focusing of the laser beam and the increase of the energy density of the beam in the interior of the light emission tube.

Then, in the case of FIG. 7(*a*), the focusing is done by the focusing lens 37 and the focusing means 32, and the light focused by the focusing lens 37 is radiated into the focusing means of the light emission tube 1, but as this is not a radiation into the light emission tube 1 after a focusing only by the focusing lens 37 such as shown in FIG. 13, the light emission tube 1 is not heated such as in the case of FIG. 13 and a damaging of the light emission tube 1 by the focused light can be suppressed. Further it is also not necessary to provide a focusing lens with a large diameter outside of the light emission tube 1 such as shown in FIG. 13.

In the case of FIG. 7(*b*), a light emission tube 1 being provided with the focusing means 32 and a focusing lens 38 being provided in the interior of the light emission tube 1 and focusing the light from the focusing means 32 are provided. As, similar to the case of FIG. 7(*a*), also in this example the beam from the laser oscillator part 2 is focused by the focusing means 32 and the focusing lens 38, the solid angle can be rendered large. Then, as in the example of FIG. 7(*b*) unlike FIG. 7(*a*) there is no radiation of focused light having been focused by a focusing lens arranged outside of the light emission tube 1 into the focusing means 32, but a radiation of focused light into the focusing lens 38, the light emission tube is not heated directly and the problem of a damaging thereof can be diminished. And because, similar to the third embodiment, the focusing lens 38 is provided in the interior of the light emission tube 1, the focal length from the focusing lens 38 to the focusing point becomes small and the solid angle can be rendered even larger. The focusing lens 38 is fixed at the focusing means 32 via a fixing part 6, but as it is sufficient if the focusing lens 38 is located at a position at which it receives focused light from the focusing means 32, this fixing part 6 can be provided at another portion than the focusing means 32.

Because, as mentioned above, according to the present embodiment a plurality of focusing means is provided, a focusing with an even larger solid angle than in the above-mentioned embodiments becomes possible. As a plurality of focusing means is provided, the extent of the focusing by the focusing means is smaller as compared to the focusing means shown in FIG. 13. Therefore, a heating of the focusing means 32 (FIG. 7(*a*)) or the focusing lens 38 (FIG. 7(*b*)) being arranged as the second means is suppressed.

Figure 8:
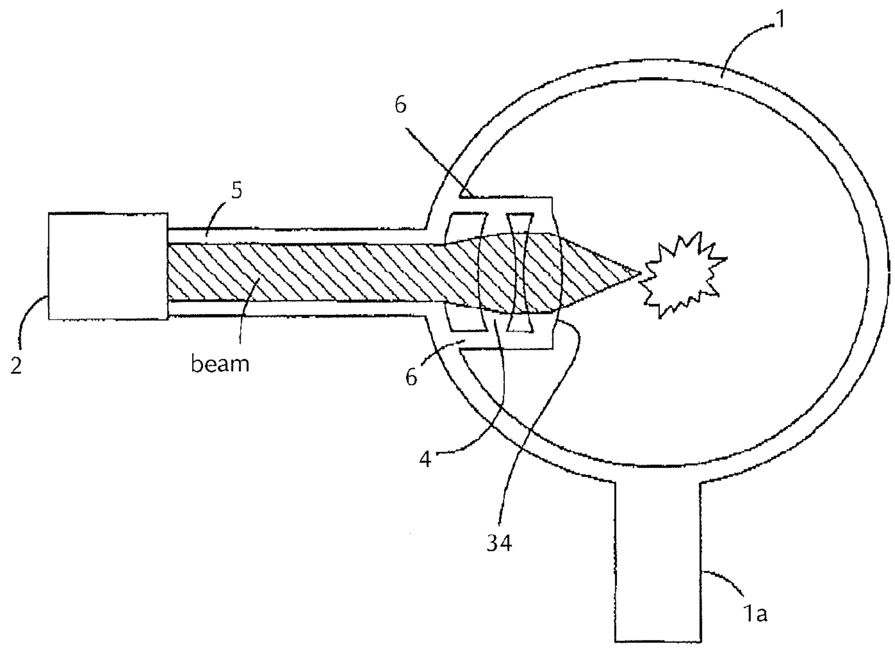
FIG. 8 is a schematic view showing a fifth embodiment of the light source device according to the present invention.

Next, a fifth embodiment will be explained using FIG. 8. The light source device of FIG. 8 is provided with a light emission tube 1 supported by a supporting body 1 a, a light guide 5 and a laser oscillator part 3 emitting a beam towards the light emission tube 1. As to the light emission tube 1 of the present invention, the light guide 5 is provided at the outer surface thereof, a collimator lens 4 is arranged at the inner surface side of the light emission tube 1 at which the light guide 5 is provided, and following this collimator lens 4 a focusing means 34 (a convex lens) is arranged inside the light emission tube 1.

In FIG. 8, the beam from the laser oscillator part 2 is guided along the light guide 5 towards the inner surface of the light emission tube 1, and when it is emitted from the inner surface of the light emission tube 1 into the interior of the light emission tube 1 the beam expands because of the difference between the refractive index of the light emission tube 1 and the refractive index of the inner space of the light emission tube 1. This expanded beam is rendered approximately parallel light by the collimator lens 4 and is focused by the focusing means 34, and the energy density increases. The light emitting element enclosed in the interior of the light emission tube 1 is ionized in the region in which the energy density of the beam has reached at least the threshold value, a high-temperature plasma state is generated and the lighting starts. Because in the present embodiment the focusing means is provided in the interior of the light emission tube 1 and the beam is focused in the interior, similar to the above-mentioned third embodiment the focused beam does not irradiate the wall of the light emission tube 1, and a heating and damaging thereof can be prevented.

Because the beam is focused in the interior of the light emission tube 1 and the solid angle thereof is rendered large, a high-temperature plasma state can be formed in the interior of the light emission tube and the starting of the lighting can be performed well. As, in particular, the focusing means 34 is provided in the interior of the light emission tube 1, the solid angle can be rendered larger than in the case of the wall of the light emission tube 1 functioning as the focusing means such as in the above-mentioned embodiments 1 and 2. Instead of the collimator lens and the focusing lens of FIG. 8, also a diffractive optical element (DOE) combining the function of a collimator lens and the function of a focusing lens can be used.

The embodiments 1 to 5 which have been explained above refer basically to the case of the provision of one focusing means at the light emission tube, but there are cases in which a plurality of beams is radiated into the light emission tube or in which the beam is radiated into the light emission tube while being focused and the beam leaving the light emission tube shall be focused, and in such cases it is conceivable to provide a plurality of focusing means at the light emission tube. In the following, the case of providing a plurality of focusing means at the light emission tube will be explained.

The provision of a plurality of focusing means at the light emission tube is conceivable for example in the following cases:

(1) A Plurality of Beams is Radiated into the Light Emission Tube

As described in the above-mentioned JP-A-61-193358 (1986), the necessity to radiate continuous or pulse-shaped laser light having sufficient intensity for a discharge excitation of the enclosed gas to light the light emission tube is contemplated, but if only one of the continuous laser light and the pulse-shaped laser light is radiated into the light emission tube the occurrence of the following problems a) and b) is possible.

a) In the case of pulse-shaped laser light the lighting is started by radiating pulse-shaped laser light having sufficient intensity for a discharge excitation of the enclosed gas into the light emission tube, but as the laser light is radiated intermittently to the enclosed gas the high-temperature plasma state is interrupted and it is conceivable that it becomes difficult to maintain the high-temperature plasma state at the time of the steady-state lighting. That means there is the possibility that the maintenance of the discharge becomes instable.

b) In the case of continuous laser light the lighting is started by radiating continuous laser light having sufficient intensity for a discharge excitation of the enclosed gas into the light emission tube, but the power of the laser light being necessary to start the discharge amounts to some ten kW to some hundred kW, and a laser device which continuously outputs laser light with such a large output power is large and costly. And if the same energy as at the time of the starting of the lighting is inputted at the time the high-temperature plasma state is maintained, the tube sphere is heated even if a focusing means is provided at the tube wall such as in the present invention, and there is the possibility that distortions of the tube wall are generated and damages occur.

To solve the above-mentioned problems, a configuration is contemplated wherein, as shown in FIG. 9(*a*), a pulsed laser oscillator part 21 emitting a pulse-shaped beam and a continuous-wave laser oscillator part 22 emitting a continuous-wave beam are provided and the laser beams being emitted from these laser oscillator parts 21, 22 are focused by focusing means 3*a*, 3*b* and are placed on top of each other in the interior of the light emission tube 1. By means of this, a pulse-shaped beam and a continuous beam are placed on top of each other in the light emission tube 1, as is shown in FIG. 9(*b*).

As to the light emitting element enclosed in the interior of the light emission tube, a lot of energy is necessary to form a high-temperature plasma state. Because the pulse-shape beam is intermittent and can form high energy, it is supposed that the light emitting element can be brought into the high-temperature plasma state by this beam. Then, the energy being necessary to maintain this state after the high-temperature plasma state has been formed may be smaller than at the time of the formation of the high-temperature plasma state, but must be continuously supplied. Because the continuous beam is superimposed in the interior of the light emission tube at the position to which the pulse-shaped beam has been emitted, and this beam has less energy with regard to the pulse-shaped beam (the vertical axis in FIG. 9(*b*) shows the relative values of the energy) and is continuous, the high-temperature plasma state can be maintained.

The case of radiating a plurality of beams into the light emission tube is not limited to the example having been described above. It is also conceivable to provide two continuous-wave laser oscillator parts. At the time of the starting of the lighting, beams from both laser oscillator parts are radiated into the light emission tube and after the lighting has been started the beam from only one laser oscillator part is radiated into the light emission tube and the lighting is maintained.

(2) A Beam is Radiated into the Light Emission Tube while being Focused and a Beam Leaving the Light Emission Tube Shall be Focused The energy of the beam radiating into the light emission tube 1 is used partly to form a high-temperature plasma state by means of the light emitting element enclosed in the interior of the light emission tube, but the rest of the beam is also present and this remaining beam leaves at the side opposite to that at which the beam has entered into the light emission tube. That is, as shown in the above-mentioned FIG. 1, the beam from the laser oscillator part 2 radiates into the light emission tube 1 from the right side of the paper sheet and a part thereof forms the high-temperature plasma state. The remaining beam leaves to the left side of the paper sheet, is focused by the focusing means 11*b* and radiates into the beam damper 12*a*.

It is not necessary that the focusing means for the radiation into this beam damper 12*a* is by all means an element being separate from the light emission tube 1. Thus, it is conceivable to provide a focusing means focusing towards the beam damper at the light emission tube. That is, in this case the provision of both a focusing means focusing the beam which radiates into the light emission tube 1 and a focusing means focusing the beam leaving the light emission tube is conceivable.

Figure 10:
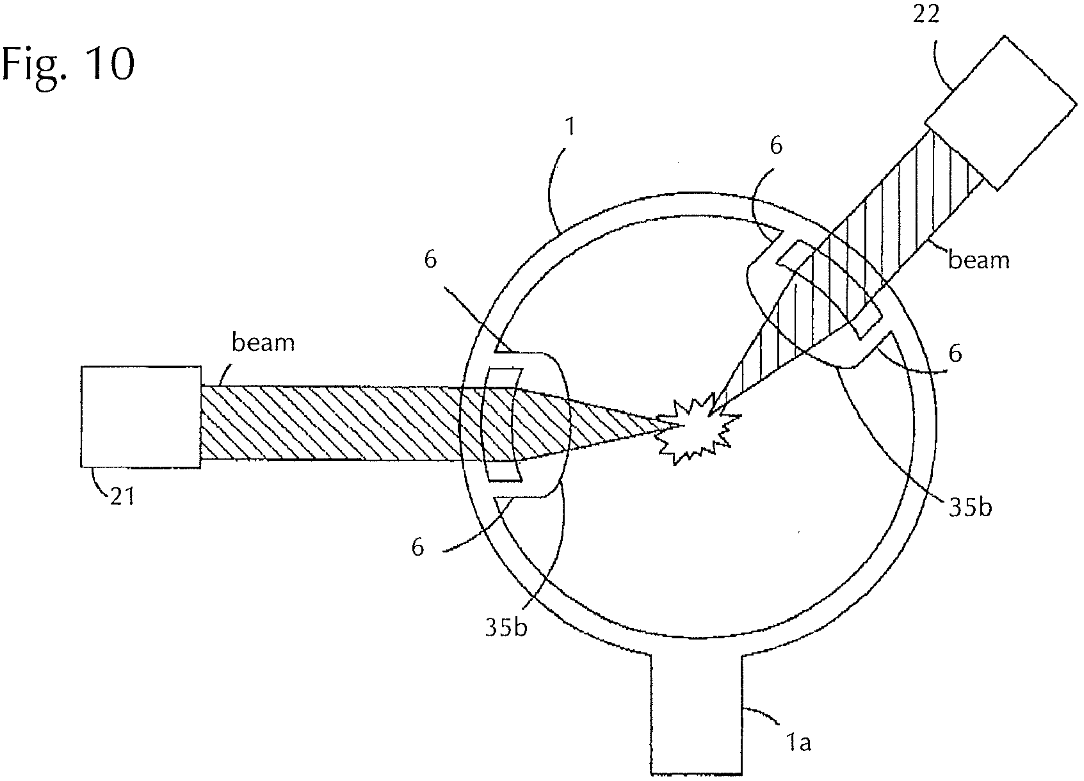
FIG. 10 is a schematic view showing a sixth embodiment of the light source device according to the present invention.

A sixth embodiment in which a plurality of focusing means is provided at the light emission tube will be explained using FIG. 10. The light source device of FIG. 10 is provided with a light emission tube 1 supported by a supporting body 1 a, a laser oscillator part 21 emitting e.g. a pulse-shaped beam towards said light emission tube 1 and a laser oscillator part 22 emitting e.g. a continuous-wave laser beam. The light emission tube 1 of the present embodiment is approximately spherical both at the outer surface and at the inner surface. At the inner surface thereof focusing means 35*a*, 35*b* fixed by rod-shaped fixing parts 6 are provided. For these focusing means 35*a*, 35*b*, as mentioned above, focusing means having the ability to focus towards the center of the light emission tube 1 can be used, and for example convex lenses can be used, as is shown in this drawing.

In the sixth embodiment, the beams emitted from the two laser oscillator parts 21, 22 are focused by the focusing means 35*a*, 35*b* provided at the inner surface of the light emission tube 1 and a region with large energy is formed in the central portion of the light emission tube 1. Thus, a high-temperature plasma state is formed by the pulse-shaped beam and interruptions of this high-temperature plasma state are suppressed by superimposing the continuous beam with a lower radiance than that of the pulse-shaped beam at the position of the formation of the high-temperature plasma state. Thus it becomes possible to maintain the high-temperature plasma state.

As in the present embodiment two focusing means are provided in the interior of the light emission tube 1 and the beams are focused in the interior, similar to the above-mentioned third and fifth embodiment the wall of the light emission tube 1 is not irradiated with a focused beam and a heating and damaging thereof can be prevented. Then, because the beams are focused in the interior of the light emission tube 1 and the solid angles of these beams can be rendered large, a high-temperature plasma state can be formed in the interior of the light emission tube and the starting of the lighting can be performed well. As, in particular, the focusing means 35*a*, 35*b* are provided in the interior of the light emission tube 1, the solid angles can be rendered larger than in the case of the wall of the light emission tube 1 functioning as the focusing means such as in the above-mentioned embodiments 1 and 2. And as two beams are radiated into the light emission tube 1, as was mentioned above, the plasma state can be formed in the light emission tube and this plasma state can be maintained stably.

Figure 11:
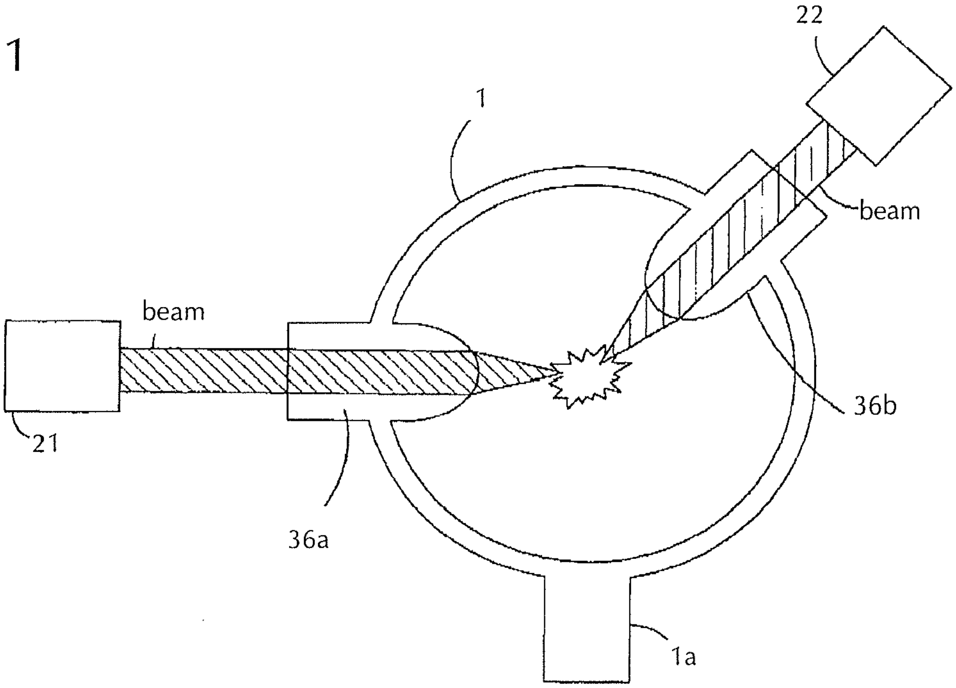
FIG. 11 is a schematic view showing a case in which a rod lens is used as the focusing means in the sixth embodiment.

In the above mentioned embodiment, an example has been shown in which focusing means being convex lenses are provided at the inner surface of the light emission tube, but it is also possible, for example, to use two rod lenses 36*a*, 36*b*, as is shown in FIG. 11. Further it is also possible that the wall of the light emission tube 1 functions as focusing means such as in the embodiments 1 and 2.

A seventh embodiment in which a plurality of focusing means is provided at the light emission tube will be explained using FIG. 12. The present embodiment is an example in which two focusing means are provided to focus the beam radiating into the light emission tube and the beam leaving the light emission tube, as was mentioned above, and here a case will be explained in which a light emission tube having the meniscus structure shown in the above-mentioned first embodiment is used.

Figure 12:
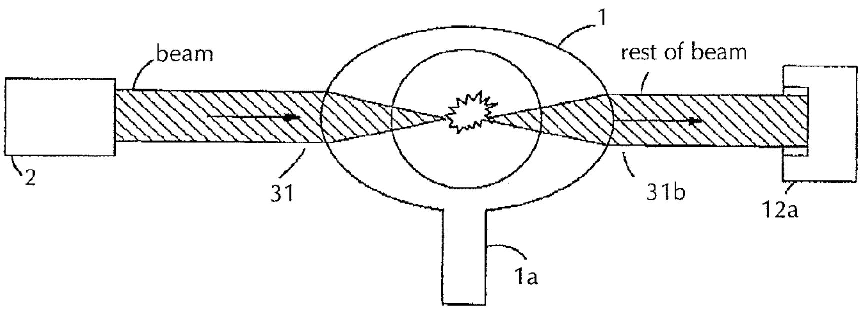
FIG. 12 is a schematic view showing a seventh embodiment of the light source device according to the present invention.

In FIG. 12, the wall of the light emission tube 1 on the left side of the paper sheet is configured by a focusing means 31*a* (a convex-shaped meniscus structure) while the wall of the light emission tube 1 on the right side of the paper sheet is also configured by a focusing means 31*b* (a convex-shaped meniscus structure). Thus, two focusing means at the two walls of the light emission tube are present on the light path of the beam. In the present embodiment the focusing means 31*a* at the left side of the paper sheet is used to focus the beam emitted from the laser oscillator part 2 in the interior of the light emission tube while the focusing means 31*b* on the right side of the paper sheet is used to focus the beam leaving the light emission tube 1 towards the beam damper 12*a*. Thus it is not necessary to provide a focusing means for the beam damper at the lamp housing, as was shown in the above-mentioned FIG. 1, and a downsizing of the device as a whole can be achieved.

The above-mentioned focusing means for the beam damper can also be arranged at the light source devices of the above-mentioned second to fifth embodiments. By the way, in the above-mentioned second and fourth embodiments a part of the tube wall of the light emission tube functions as a focusing means, but in such a case it is preferred for the following reason that the light emission tube and the focusing means are made up from the same material. It is necessary that the part of the focusing means is transmissive for the beam while it is necessary that the remaining portions are transmissive for the excitation light from the interior of the light emission tube. Therefore, the part of the focusing means and the remaining portions can be made up from different materials. But because the light emission tube is subject to the radiation heat etc. in the interior of the light emission tube and is heated during the lighting of the lamp, in case of making up the focusing means and the remaining portions from different materials there the risk that the problem of damages in the vicinity of the interface of the focusing means and the remaining portions occurs if the coefficients of thermal expansion of both materials are too different. Therefore, it is preferred that the focusing means and the remaining portions are made up from the same material.

What is claimed is:

1. A light source device provided with a light emission tube in which a light emitting element is enclosed and at least one laser oscillator part for radiating a laser beam towards said light emission tube, wherein a part of a tube wall of said light emission tube is made to function as a focusing means, said focusing means has a focal point in the interior of the light emission tube, and said light emission tube is made of a material that is transmissive for the laser beam from the laser oscillator part and is transmissive for the excitation light of the light emitting element.

2. A light source device according to claim 1, wherein an additional focusing means is provided at an inner surface of the light emission tube on a light path of said laser beam.

3. The light source device according to claim 2, wherein the focusing means is provided remote from an inner surface of the light emission tube and within the light emission tube.

4. The light source device according to claim 2, wherein the focusing means is selected from at least one of a lens and a diffractive optical element.

5. The light source device according to claim 1, wherein the focusing means is implemented as a meniscus structure in which a radius of curvature of an outer surface of said light emission tube is smaller than a radius of curvature of an inner surface thereof.

6. The light source device according to claim 1, wherein the focusing means is implemented as a plano-convex structure in which an outer surface of said light emission tube is formed as a curved surface while an inner surface thereof is formed as a flat surface.

7. The light source device according to claim 1, wherein a further laser oscillator part is provided and wherein another part of a tube wall of said light emission tube is formed as another focusing means, said another focusing means also having a focal point in the interior of the light emission tube.

8. The light source device according to claim 7, wherein the laser oscillator part is adapted to emit a pulse-shaped laser beam and wherein said further laser oscillator part is adapted to emit a continuous laser beam.

9. The light source device according to claim 1, wherein a further focusing means is provided on the light path of said laser beam outside of the light emission tube.

10. The light source device according claim 1, wherein said light emission tube is made of quartz glass.

* * * * *